US009470886B2

(12) United States Patent
Bartlett

(10) Patent No.: US 9,470,886 B2
(45) Date of Patent: Oct. 18, 2016

(54) SPLIT PHOSPHOR/SLIT COLOR WHEEL SEGMENT FOR COLOR GENERATION IN SOLID-STATE ILLUMINATION SYSTEM

(71) Applicant: TEXAS INSTRUMENTS INCORPORATED, Dallas, TX (US)

(72) Inventor: Terry Alan Bartlett, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 99 days.

(21) Appl. No.: 14/163,985

(22) Filed: Jan. 24, 2014

(65) Prior Publication Data

US 2014/0204558 A1 Jul. 24, 2014

Related U.S. Application Data

(60) Provisional application No. 61/756,407, filed on Jan. 24, 2013.

(51) Int. Cl.
G02B 26/00 (2006.01)
F21V 14/08 (2006.01)
G03B 21/20 (2006.01)

(52) U.S. Cl.
CPC ............. *G02B 26/008* (2013.01); *F21V 14/08* (2013.01); *G03B 21/204* (2013.01)

(58) Field of Classification Search
CPC ............. G02B 26/008; H04N 9/3161; H04N 9/3114; H04N 9/3158; G03B 21/204
USPC ................................................ 353/84; 362/84
See application file for complete search history.

(56) References Cited

U.S. PATENT DOCUMENTS

| 7,762,675 | B2 * | 7/2010 | Hoffman | H04N 9/3114 348/743 |
|---|---|---|---|---|
| 2010/0328554 | A1 * | 12/2010 | Shibasaki | 348/760 |
| 2010/0328632 | A1 * | 12/2010 | Kurosaki | G03B 21/204 353/98 |
| 2011/0211333 | A1 | 9/2011 | Bartlett | |
| 2012/0201030 | A1 * | 8/2012 | Yuan et al. | 362/293 |
| 2013/0242534 | A1 | 9/2013 | Pettitt et al. | |
| 2014/0253882 | A1 * | 9/2014 | King et al. | 353/31 |

OTHER PUBLICATIONS

U.S. Appl. No. 14/155,009, "Hybrid Laser Excited Phosphor Illumination and Method," filed Jan. 14, 2014.
U.S. Appl. No. 14/157,269, "Phosphor Wheel Illumination Region Using Laser Light Reflective Region," filed Jan. 16, 2014.

* cited by examiner

Primary Examiner — Bao-Luan Le
Assistant Examiner — Christopher Lamb, II
(74) Attorney, Agent, or Firm — Michael A. Davis, Jr.; Frank D. Cimino

(57) ABSTRACT

Apparatus for generating blue color illumination for use in a projection system a color wheel with segments of respective different color light emitting phosphors formed over light non-transmitting portions and at least one blue color generating segment. The blue color generating segment has cyan color light emitting phosphor formed over a light non-transmitting first portion and a second portion that transmits blue laser light through the wheel. A dichroic filter directs blue laser light from a light source onto the respective segments as the color wheel rotates. The light strikes the first and second portions of the blue color generating segment to generate blue light at a color point determined by both blue laser light and phosphor emitted cyan light.

3 Claims, 7 Drawing Sheets

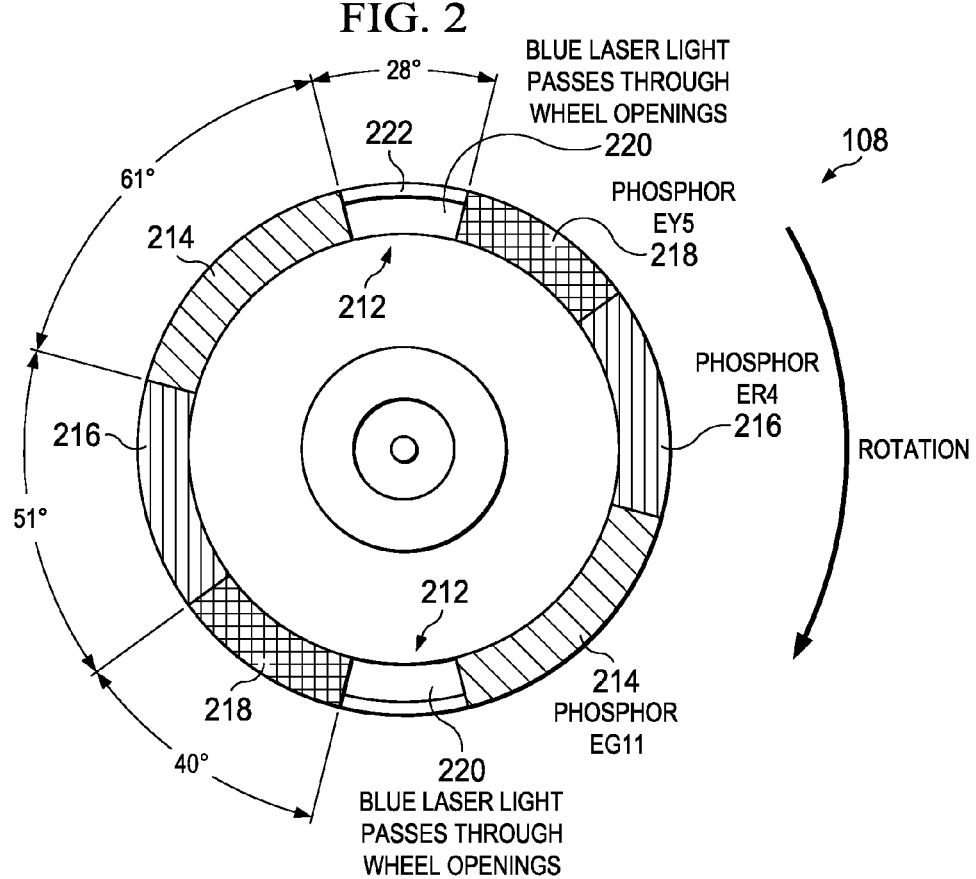
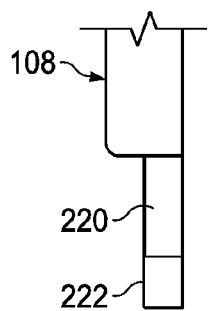

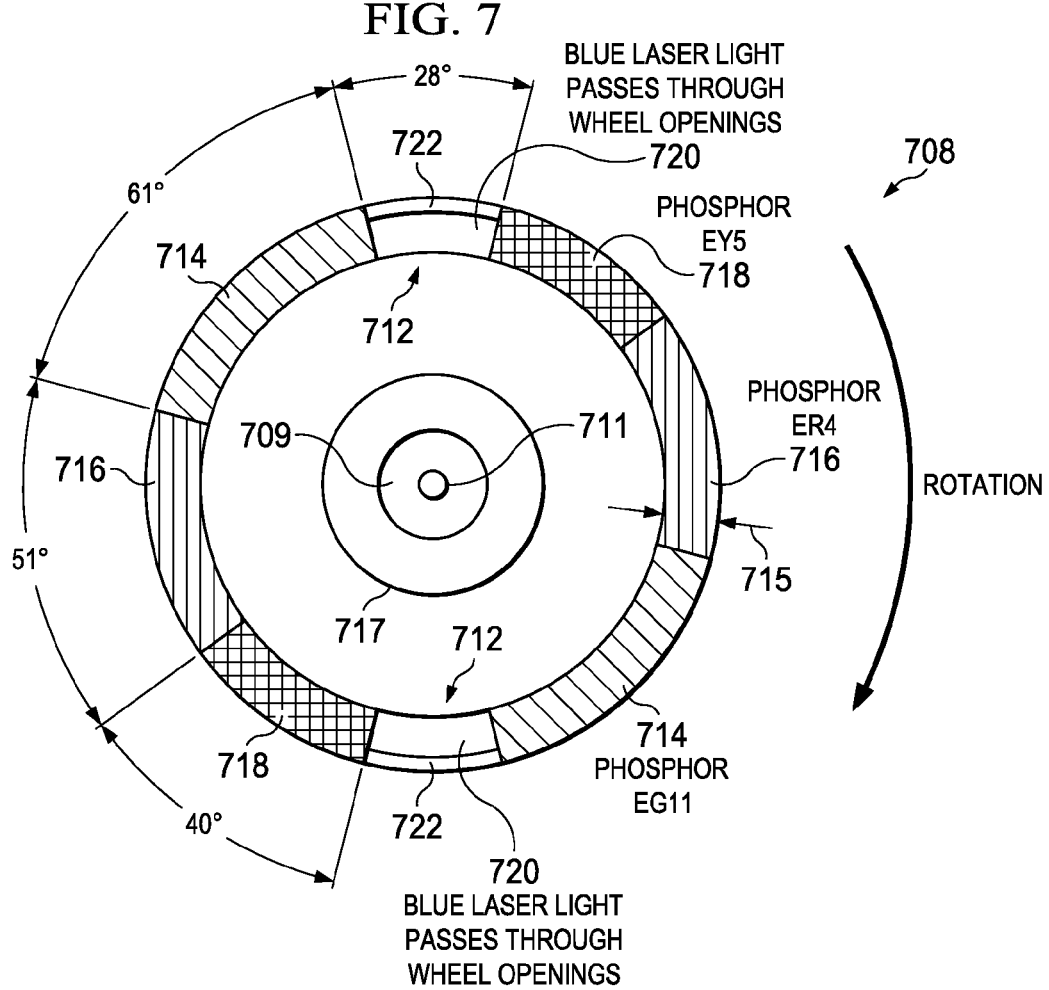
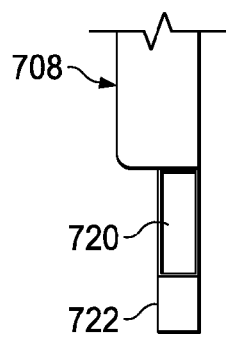

US 9,470,886 B2

SPLIT PHOSPHOR/SLIT COLOR WHEEL SEGMENT FOR COLOR GENERATION IN SOLID-STATE ILLUMINATION SYSTEM

This application claims the benefit of Provisional Application No. 61/756,407, filed Jan. 24, 2013, the entirety of which is hereby incorporated by reference.

BACKGROUND

This relates to generation of sequential color illumination in solid state laser projection systems and the like.

Current solid state illuminated projectors producing more than about 1000 lumens utilize blue laser diodes and a spinning phosphor wheel. The illumination typically involves sequential generation of blue, green and red color light, and the sequentially generated different colored light is directed to a pixel light modulator of one type or other. The pixel light modulator may, for example, be a spatial light modulator such as a Texas Instruments DLP™ digital micromirror device (DMD) whose mirrors are individually set using pulse-width modulation (PWM) intensity grayscaling with settings synchronized to respective time segments for illumination of the mirrors by the respective sequentially generated colors.

In a typical solid state illumination (SSI) system, at least red, green and blue color illumination time segments are generated. Other color time segments (viz., secondary color, white, and black periods) are also possible. In a usual arrangement, a green color light is generated indirectly by illuminating a green color-emitting segment of the spinning phosphor wheel with light from a typically blue laser light emitting diode (LED), while red color light is generated either indirectly by illuminating a red color-emitting phosphor segment of the same wheel with the blue laser light or directly by using a separate red light LED. The blue color light is usually generated directly using the blue laser light itself. A diffuser is typically used to reduce speckle from the coherent light.

An example solid state projector that uses blue laser LEDs and a phosphor color wheel as an illumination system and a spatial light modulator for modulation of the generated illumination is described in application Ser. No. 13/652,129 filed Oct. 15, 2012, entitled "Projector Light Source and System, Including Configuration for Display of 3D Images," the entirety of which is incorporated herein by reference. Such system utilizes blue lasers as a direct source of blue color light and utilizes the blue lasers as an indirect source of other color light by energizing other color light producing phosphors with the blue color light from the blue lasers. The overall layout for such a system is illustrated schematically in FIG. 1, which has an insert showing the combining of outputs from banks of lasers into a single diffused blue light input beam. Because the illumination system generates one output color directly from the input source light and one or more other output colors indirectly by secondary emission, projectors utilizing such illumination systems are often referred to as hybrid SSI laser projectors.

The arrangement 100 shown in FIG. 1 is typical for a solid state projector that uses blue lasers and a phosphor wheel as a sequential color illumination source. One or more banks of lasers 102 direct blue color coherent laser light onto a dichroic filter 104 which reflects the laser light via a focusing lens 106 onto a color wheel 108. The color wheel 108 includes angularly spaced segments of respective different color wavelength light emitting phosphors formed over a light reflecting surface, as well as clear laser blue color wavelength light transmitting segments. The laser light is focused to be sequentially incident on the respective different segments as the wheel 108 is rotated.

A typical phosphor color wheel 108 as used in the described solid state projector has annular arcuate region segments (viz., sectors of an annulus defined by two radii separated by an inner angle and by the inner and outer arcs they intercept) coated with different color emitting phosphors disposed at respective angularly spaced positions in a ring, circumferentially about a circular wheel. FIG. 2 illustrates an example phosphor color wheel of this type. For image display, the color wheel 108 is rotated to move the phosphor coated ring through a given angular rotation (e.g., ½, 1 or 2 revolutions) during an image frame display time (eye integration time). The laser light input beam is directed onto the wheel annulus to illuminate an area (viz., spot) relative to which the different segments pass sequentially as the wheel rotates. The wheel is typically rotated at a constant rotational speed, with the angular extent of the respective different color generating segments determined, at least in part, by the relative brightnesses of the generated illumination.

In the example wheel 108 shown in FIG. 2, the wheel is a circular wheel having a reflective aluminum front surface (surface facing the input beam) 210 and different color generating annular sectors 212, 214, 216, 218 angularly spaced circumferentially about a marginal band. The wheel 108 is mounted centrally for rotation about a shaft at an adjustably settable, constant rotational speed (viz., one revolution per image frame display time). The illustrated wheel has two instances of angularly-spaced blue 212, green 214, red 216 and yellow 218 color generating segments which are sequentially driven past the incident input beam. Although not required, the illustrated sequence is the same in each instance. The blue segment 212 comprises a slit 220 for generating blue color by passing the input beam through the slit 220 and around an optical wraparound path (e.g., comprising reflecting elements 110, 112, 114 shown in FIG. 1), back to the projection optics. The green, red and yellow segments 214, 216, 218 comprise respective annular regions coated with different color light-emitting phosphors for respectively emitting corresponding green, red and yellow color light when energized by the incident input beam.

As the wheel 108 rotates, blue laser light from the lasers 102 is reflected by one side of filter 104 (viz., blue reflective dichroic mirror) to be sequentially incident upon the slit segments 212 and the green, red and yellow light emitting phosphor segments 214, 216, 218, respectively. When wheel 108 is rotated to a position where incident light is directed at a slit segment 212, blue light passes through slit 220 and is routed by the optical wraparound path 110, 112, 114 back to the other side of filter 104 which reflects the returned blue light along an optical path for modulation by a spatial light modulator and projection of an image onto a screen or other display surface. A diffuser 116 is optionally provided in the wraparound path to reduce imaging speckle using the returned laser light. When wheel 108 is rotated to a position where incident light is directed at a phosphor covered segment 214, 216, 218, the phosphors at that segment are energized to emit the color wavelength light characteristics of the phosphors of that segment. For the wheel 108 arrangement illustrated in FIG. 2, as the wheel rotates the laser light is first incident on a green light emitting phosphor segment 214, then on a red light emitting phosphor segment 216, and then on a yellow phosphor emitting segment 218. In each case, the emitted color (G, R, Y) is directed back through the lens 106 toward the dichroic filter 104. The filter 104 passes the phosphor emitted color for modulation by the spatial light modulator and projection of the image onto the display surface. In the illustrated arrangement, although not required, the same filter 104 is used to reflect both the incident and the returned blue light, as well as to transmit the green, red and yellow phosphor emitted light; and, although also not required, the returned blue light and transmitted green, red and yellow light are directed along the same optical path for modulation and image projection.

The spatial light modulator—which may, for example, include an addressable micromirror array such as a Texas Instruments DLP™ digital micromirror device (DMD)—includes light modulating elements that can be individually controlled in synchronism with the generated light to set the illumination intensity for that color contribution to corresponding individual ones of pixels of the displayed image. For example, the modulating elements may be controlled to provide a grayscale contribution of each color for the pixels using "on"/"off" settings specified for different time slices of a pulse width modulation (PWM) cycle time, with the greater number of "on" times providing a greater intensity, and the greater number of "off" times providing a lesser intensity—the cumulation of the PWM cycles for all the colors being integrated by the eye to give a particular color point and intensity for each pixel during a given image frame display time. Control of the modulating elements in a typical micromirror array implementation will be by changing the positioning of the individual mirrors to reflect the generated light toward or away from the display surface in accordance with weighted time segment bit plane color sequences developed from color contribution intensity data received on a frame-by-frame basis from an input imaging data stream. The data for the bits of the different color bit planes are developed and loaded in correspondence with the colors, order and timing characteristics of the particular color wheel utilized, the illustrated arrangement being just one example.

When rotated at constant rotational speed, the arcuate (angular) extent of each segment 212, 214, 216, 218 determines the amount of time that the color generated by that segment will be available for modulation to produce the corresponding color intensity contribution for the various pixels of the displayed image. The relative arcuate extents are thus established, at least in part, based upon the relative maximum intensities of the segment generated colors. Thus, the blue segment 212—which generates the brightest color because it passes the input blue laser light directly for generation of the blue color illumination—has the shortest angular extent, and the green segment 214—which generates the weakest intensity light by incident laser light energization of the color producing phosphors—has the longest angular extent. The illustrative layout shown in FIG. 2, for example, provides blue, green, red and yellow color sequences using 2×28° blue laser light transmitting slit segments 212, 2×61° green light emitting phosphor segments 214, 2×51° red light emitting phosphor segments 216, and 2×40° yellow light emitting phosphor segments 218.

FIG. 3 illustrates an example color gamut for a hybrid SSI laser projector utilizing a color wheel 108 like that shown in FIG. 2. Phosphors determine the red and green color points, and laser light passing through the slit opening 220 and the laser input beam wavelength determine the blue color point. For the wheel 108 shown in FIG. 2, the opening 220 takes the form of a window with an arcuate metal strip 222 left at the wheel circumference, radially outwardly bordering the window. This strip 222 leaves the circular wheel with an unbroken outer edge that improves rotational stability and reduces audible noise generation. The laser beam (spot) is directed to completely pass through the window opening. FIG. 4 shows an enlarged side view section of one example implementation of a clear (blue) segment 212 of the color wheel of FIG. 2.

Other arrangements for generating color sequences during relative movement of a color wheel and input light beam are also possible. An example color wheel having concentric annular tracks or rings of the respective different color emitting phosphors located at different radially spaced locations is described in Patent Application Pub. No. US 2011/0211333 A1, published Sep. 1, 2011, entitled "Wavelength Conversion," the entirety of which is incorporated herein by reference.

An example of a blue laser light source used in SSI systems is a blue laser diode, such as commercially available from Nichia, that emits light in the 445-448 nm wavelength spectral region. Such laser diodes are relatively inexpensive and efficient. However, the dominant wavelengths of such less expensive laser diodes are shorter than typically used in non-SSI illumination system, so may result in a less aesthetically pleasing purplish blue color contribution in the displayed image.

Several approaches have been suggested to modify the blue color emitted using light from the blue lasers as a direct source for blue color generation. The use of cyan phosphor in combination with blue laser light in a system using a blue light wraparound path is described in application Ser. No. 14/155,009 filed Jan. 14, 2014, entitled "Hybrid Laser Excited Phosphor Illumination and Method," the entirety of which is incorporated herein by reference. Other approaches for combining phosphor emitted cyan light with blue lase light for blue color generation are described in application Ser. No. 14/157,269 filed Jan. 16, 2013, entitled "Phosphor Wheel Illumination Using Laser Light Reflective Region," the entirety of which is incorporated herein by reference. The use of cyan emission in combination with diffused blue laser light moves the blue color point coordinate to a more desirable position.

An implementation of the first approach is illustrated in FIG. 5. In this approach, a transparent plate 510 (viz., glass slide) coated with a thin layer of cyan emitting phosphor is attached over color wheel 108 in alignment with each blue segment 212 to completely cover the slit opening 220. FIG. 5 shows one plate 510 applied over the opening 220 and strip 222 of one segment 212 (top segment 212 in FIG. 5) and another plate 510 being applied to and brought into alignment with another segment 212 (bottom segment 212 in FIG. 5). The phosphor layer is thin enough to enable a portion of the blue light directed from light source 102 and reflected off one side of filter 104 onto a blue segment 212 of wheel 108 (see FIG. 1) to pass through plate 510 and slit 220, return by the wraparound path 110, 112, 114, and reflect off the other side of filter 104 into the projection optics path; while simultaneously enabling another portion of the incident blue light to energize the phosphor to emit cyan light. A part of the emitted cyan light passes through slit 220 and around the wraparound path 110, 112, 114 to the other side of filter 104. For this part, those wavelength components of the emitted cyan light that fall within the reflectivity characteristics of filter 104 are reflected by the filter and pass into the projection optics path along with the returned blue laser light. Another part of the cyan light is emitted on a return path from the segment 212 directly back toward filter 104, without going around the wraparound path 110, 112, 114. For this part, wavelength components that meet the transmissivity characteristics of filter 104 are pass through the filter into the projection optics path. FIG. 6 illustrates modification of the blue color point toward a more pleasing blue color, using the combination of direct blue and phosphor emitted cyan light. This approach has several drawbacks. The use of a separate glass slide over the metal wheel adds cost and complexity, and may cause problems due to different thermal expansion rates when the wheel heats up. Also, using the separate glass slide, the thickness of the thin layer phosphor must be tightly controlled to maintain consistency for establishing the desired blue color point coordinate. Moreover, the binder used in the phosphor coating may scatter light, thereby reducing efficiency.

The second approach does not use a slit or a wraparound path for the blue light segment. It utilizes a thin layer of cyan emitting phosphor coated over a reflective surface of the color wheel, and a polarization selective dichroic filter. A portion of input blue light of a given polarization reflects off the filter, passes through a quarter wavelength plate (QWP), reflects off the surface of the color wheel, and passes back through the quarter wavelength plate to the filter. The two passes through the quarter wavelength plate change the polarization of the blue light so that the reflected light is transmitted through the filter toward the projection optics. Another portion of the input light reflected off the filter energizes the thin phosphor coating over the reflective surface to emit cyan light back toward the filter. Components of the cyan (blue-green) light transmitted by the filter pass through the filter toward the projection optics, together with the transmitted portion of the reflected blue light. This approach requires different filter characteristics, presents similar cyan phosphor thickness control and binder scattering concerns as the first approach, and has other light throughput efficiency concerns.

SUMMARY

An example color wheel in a illumination (SSI) system of a type used for sequential color illumination of a spatial light modulator in a projector for the display of images, has a segment for generation of an illumination color point from simultaneous direct use of input light incident from a solid state diode or other laser light source combined with indirect production of light emitted by phosphor responsive to incidence of the input light.

BRIEF DESCRIPTION OF THE DRAWINGS

FIG. 2 illustrates an example color wheel usable in the illumination system of FIG. 1.

FIG. 4 shows an enlarged side view section of one example implementation of a segment of the color wheel of FIG. 2.

FIGS. 7 and 8 illustrate an example implementation of a color wheel embodiment.

DETAILED DESCRIPTION OF EXAMPLE EMBODIMENTS

Figure 1:
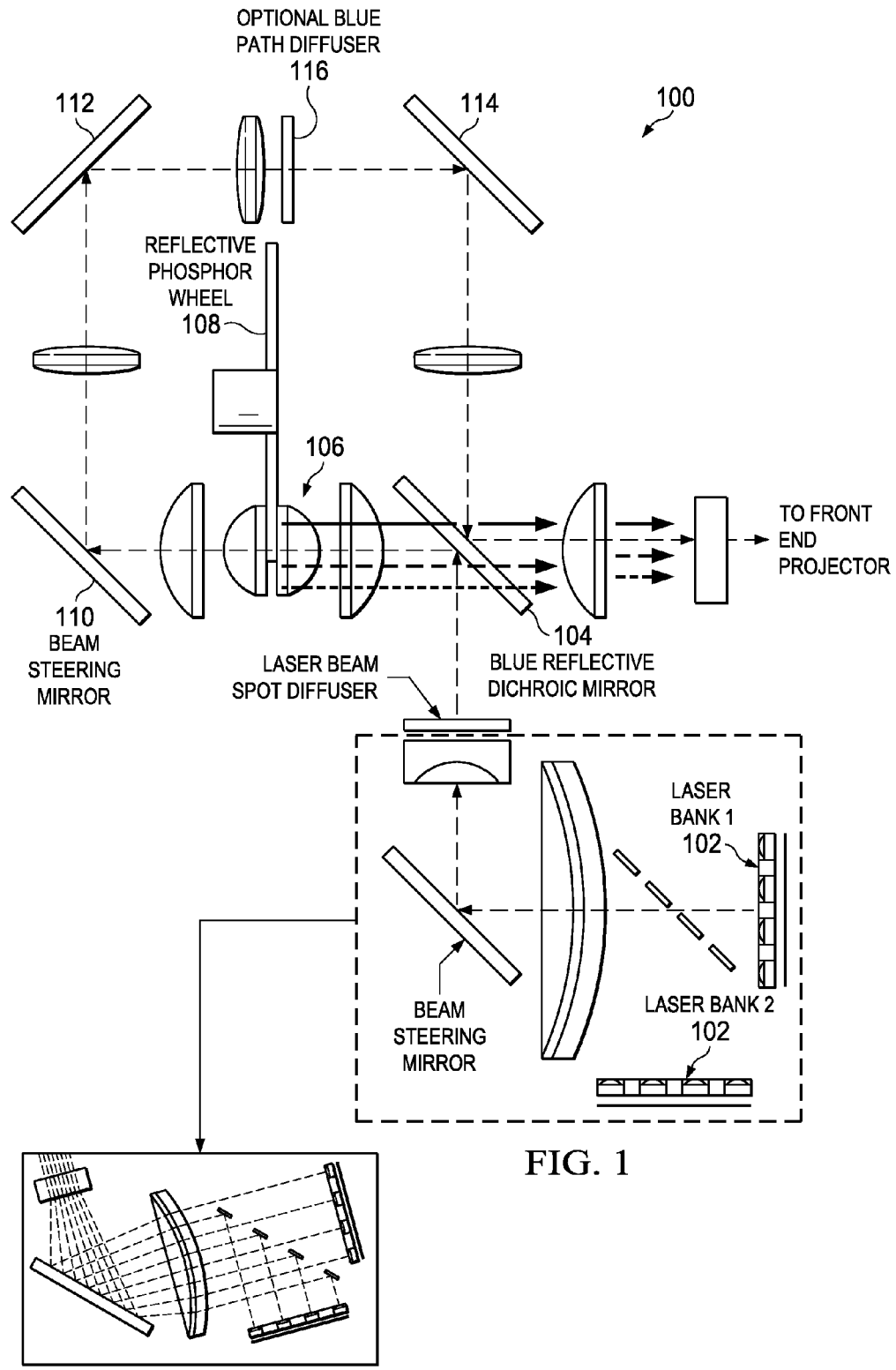
FIG. 1 illustrates an example solid state projector using laser light and a phosphor color wheel as an illumination system.
Figure 3:
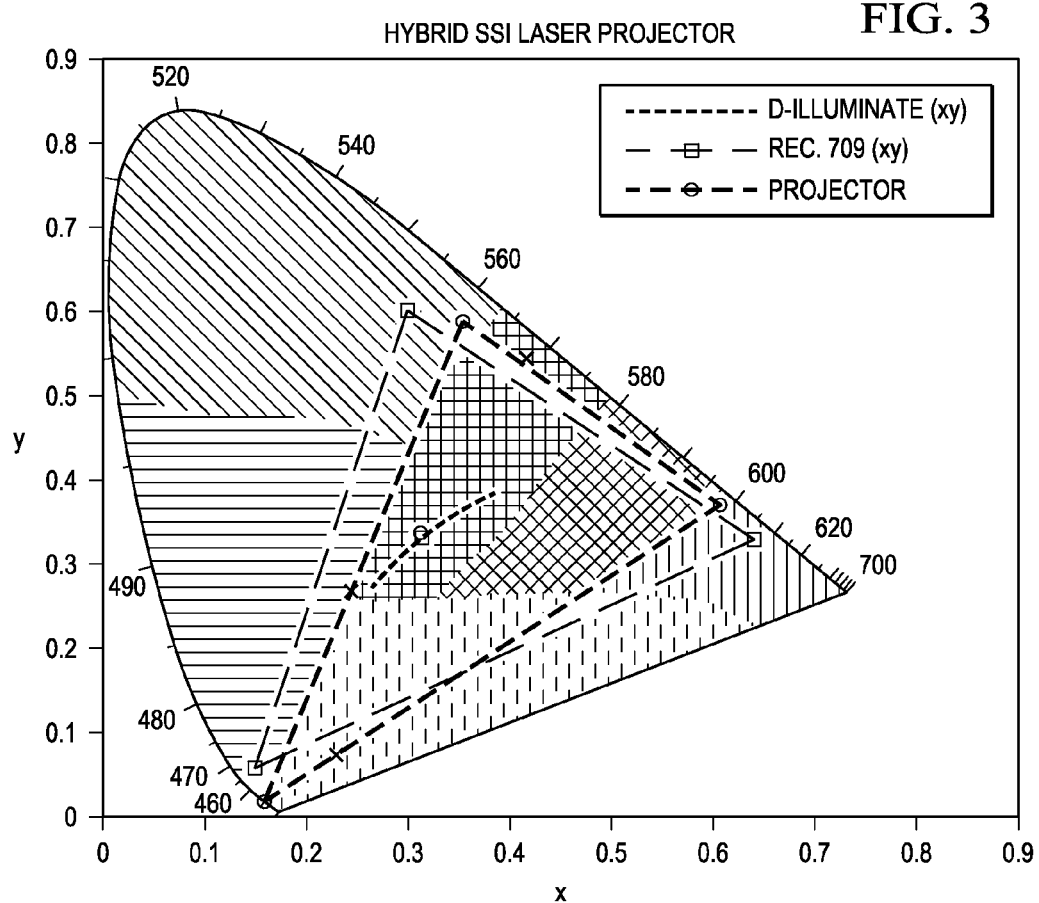
FIG. 3 illustrates an example color gamut for a projector utilizing a color wheel like that shown in FIG. 2.

An example implementation of a color wheel 708 incorporating principles of the invention is illustrated in FIGS. 7 and 8. The example wheel 708 is configured for use in a solid state illumination system having elements such as generally shown in FIG. 1, for the sequential generation of blue, green, red and yellow color light for corresponding sequential respective different color illumination of a modulator such as, for example, a light reflective or transmissive spatial light modulator (SLM). An example of a usable modulator for this application is a Texas Instruments DLP™ digital micromirror device (DMD). Such device has an array of individually settable mirrors positioned at spatial locations corresponding to pixel locations of an image to be displayed, with the settings of the mirrors synchronized for providing an eye integrated intensity contribution of each color for each pixel during an available frame display time, using pulse-width modulation (PWM) duty cycles for "ON" times of weighted time duration subdivisions of the total illumination time provided by the rotated color wheel for that color. The same principles described in connection with color wheel 708 are applicable to other color wheels configured for use in other applications, and to color wheels used for the generation of different colors and/or different sequence ordering.

As shown in FIG. 7, color wheel 708 is a circular wheel having a plurality of annular arcuate region segments 712, 714, 716, 718, which correspond geometrically to sectors of an annulus defined by two radii separated by an inner angle and by the inner and outer arcs they intercept. The segments 712, 714, 716, 718 are disposed at respective angularly spaced positions in a ring, circumferentially about the wheel 708, with each segment serving to generate a respective different one of the blue, green, red and yellow colors of the sequence for illumination of the spatial light modulator at a respective different time as wheel 708 rotates a given number of rotations during an available image frame display time. In the example implementation, the color wheel 708 has two instances of the same size and sequential order of each segment 712, 714, 716, 718 for generation of each respective blue, green, red and yellow color twice for a single rotation of wheel 708 driven past an area of light incident from a laser light input beam focused at a fixed location spot on the phosphor band. It will be appreciated, that the colors, numbers of colors, sizes, and instances of the segments can be tailored to specific needs and preferences, as can the number, area and location of spots of light incident on the wheel. Also, although in the example implementation the color wheel is rotated at a given fixed rotational speed to complete one rotation during an available frame image display time, the rotational speed may be set to complete any number or partial number of revolutions desired, or may be set to vary in accordance with variations in image characteristics or content (e.g., average pixel intensity across an image, variances in color contribution illumination times, etc.).

The example wheel 708 may be a flat, thin planar disk 710 made of lightweight aluminum provided with a central opening 709 for mounting on a rotary shaft 711 of a selectable speed AC motor. The aluminum material may be polished or otherwise finished to provide a highly reflective front surface at least in locations of an outer annular band 715 on which the input light beam spot is incident. An inner annular band of weight balancing material 717 or other mechanism may be provided which can be adjusted or accommodated for balancing the wheel to provide stability during rotation.

The green, red and yellow segments 714, 716, 718 comprise respective annular regions of the reflective front surface of the wheel 708 which have been coated with different color light-emitting phosphors for respectively emitting corresponding green, red and yellow color light when energized by the incident input beam.

The blue segment 712 comprises a slit defined by an opening 720 (see FIG. 8) for generating blue color by passing light from the input beam through the slit and around a wraparound path (see FIG. 1), back to the projection optics. For the wheel 708 shown in FIG. 8, the opening 720 defining the slit takes the form of an annular window with an arcuate metal strip 722 at the wheel circumference, radially outwardly bordering the window. The strip 722 may be formed by stamping or cutting out an annular portion of a sector of the disk, leaving an arcuate strip of the disk material remaining radially outwardly of the stamped or cut opening. The strip 722 may alternatively be formed by stamping or cutting an annular portion of a sector 712 of the disk, leaving none of the disk material remaining radially outwardly of the stamped or cut opening, and then adding the strip 722 of a same or different material as an outer border at the disk circumference. On the one hand, forming the strip 722 by material left in place may involve fewer manufacturing steps and may also give good disk integrity for rotational and thermal stability. On the other hand, adding the strip 722 may facilitate using a decreased thickness of material for the strip which, together with rounding the inner edge at the back of the window (see FIG. 8), may be advantageous in avoiding unwanted reflections for blue light passing through the window.

The window 720 may be shaped to accommodate individual preference and needs. The illustrated window 720 has a cross-section in the plane of the disk circle defined by an outer arc established by an inner edge of strip 722, an inner arc established by an inner edge of the cutout adjacent the main central portion of the disk, and left and right straight borders established by radial cuts forming a given internal angle of radial separation (28° in the example shown) that defines the blue segment 712 angular dimension. The cross-section is generally uniform through the disk, from the front to the rear disk surface, at least for the thickness extent of the strip (except for some rear edge rounding, if desired).

The window 720 may also be formed without an outside strip 722, with just an opening going all the way to the disk circumference. However, strip 722 provides the wheel with an unbroken outer edge that offers advantages of better rotational stability and reduced audible noise generation.

As discussed above, input laser light from a blue laser diode light source (102 in FIG. 1) can be utilized directly for image display by directing the input light at an angled dichroic filter (104), through the color wheel blue segment slit 720, and in a wraparound reflective path (110, 112, 114) back to the angled filter (104) and on to projection modulator and optics. The blue light from a currently commercially available inexpensive blue laser diode light source may, however, not be at a color point desired for a particular implementation. For example, it may be too purplish. To modify the blue point, the blue illumination may be modified by using a cyan color producing phosphor excited by the blue laser light in combination with diffused blue light directly obtained from the blue laser light source. This could be done, for example, by adding a glass plate with a thin cyan color producing phosphor coating over the slit, as described in application Ser. No. 14/155,009 (discussed previously), wherein a portion of the blue laser light incident on the color wheel blue segment will pass as blue light directly through a slit, and another portion will encounter and energize phosphor particles to emit cyan colored light, a part of which will join the transmitted laser light in a wraparound path and another part of which will be directed back toward the filter. This could also be done without a slit, for example, using a cyan producing phosphor coating a reflective surface, but with a thinner or broken coating compared to the coatings used for the green, red and yellow color generating phosphor segments. With such approach, as described in application Ser. No. 14/157,269, a color point modification is achieved through combining a portion of the incident blue laser light recaptured from direct reflection off the reflective surface (e.g., from laser light reaching the surface through gaps in the phosphor coating) with cyan light emitted by the phosphor (e.g., by laser light encountering phosphor in the phosphor coating).

There are complexities, however, with formulating a thin phosphor layer that enables some incident light to pass unobstructed (through the plate or to the reflective surface) and other incident light to energize the phosphor, both in a way that is uniform across the segment arc and that is also repeatable from one wheel to the next. To enable more uniformity and repeatability in shifting the blue color point, it may thus be advantageous to use a blue segment configuration that provides direct blue light transmission or reflection in combination with phosphor emitted cyan, but applies the cyan producing phosphor in a thicker coating such as done for the green, red and yellow segments.

Figure 5:
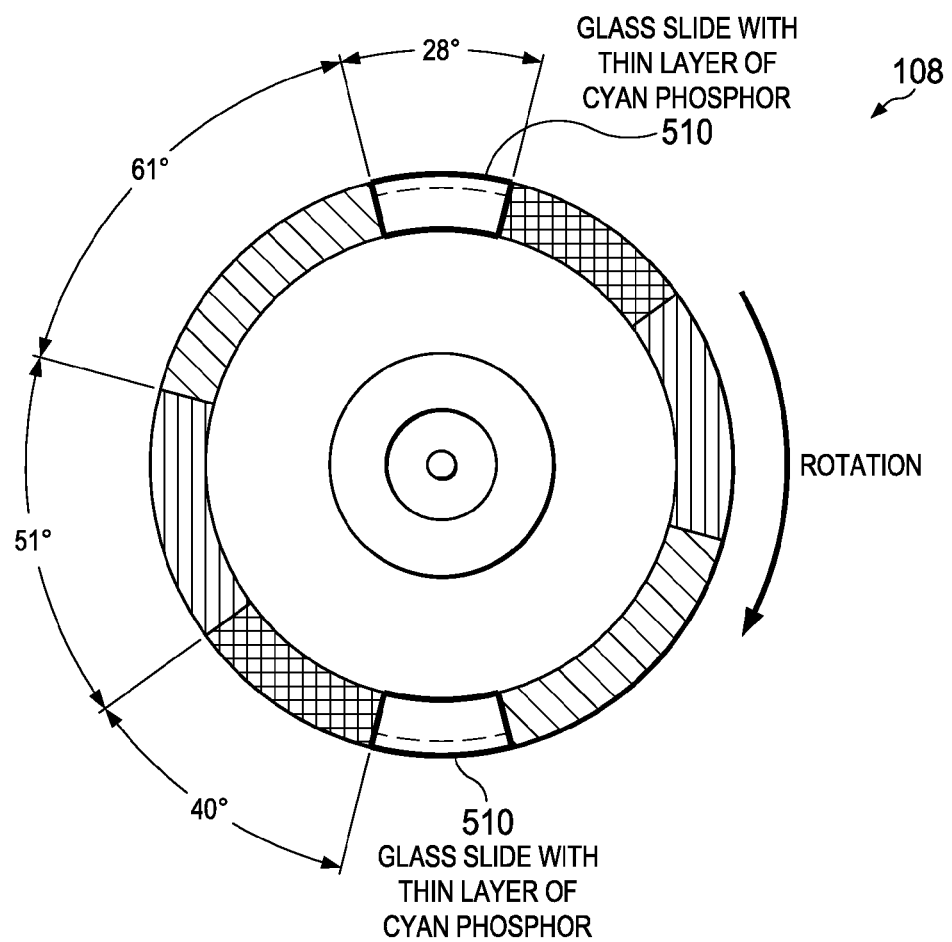
FIG. 5 illustrates a color wheel having a segment with transmissive plate covered with a thin phosphor coating.
Figure 6:
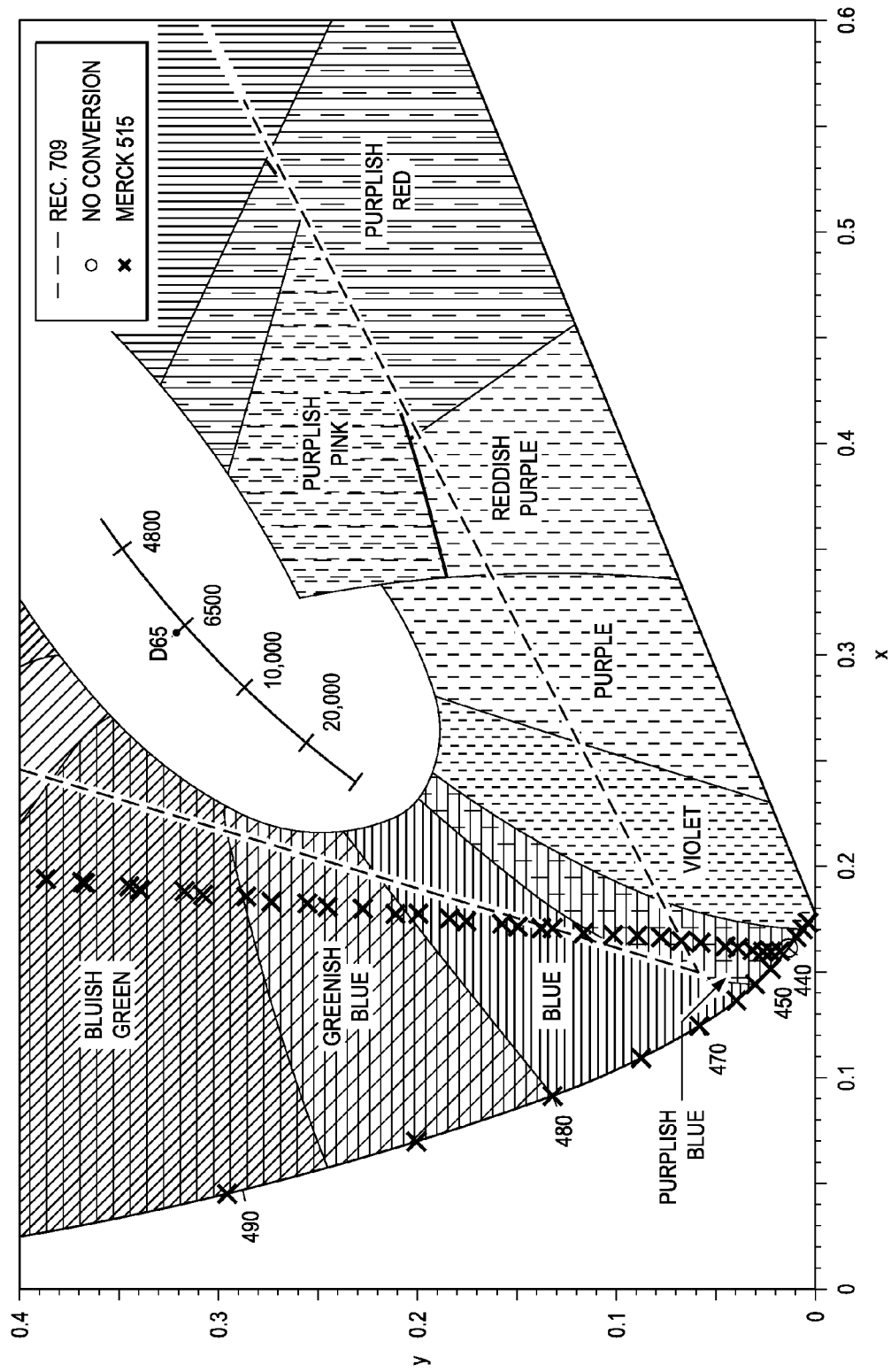
FIG. 6 illustrates a modification of the blue color point using the combination of direct laser input and phosphor emitted light.

One approach for doing this is to have two different instances of the blue segment on the color wheel. For example, one instance of the blue segment of the wheel shown in FIG. 5 could be the slit window alone, with no cyan phosphor on that segment; and the other instance of the blue segment could be a solid unbroken (no slit window) reflective surface coated with cyan emitting phosphor with a coating similar to the coatings applied for the green, red and yellow emitting phosphors for the other color segments. The blue illumination contribution in the projected image frame would thus be made up of two components: A direct laser blue light component generated when the first instance of the blue segment is in line with the incident light (this could be direct transmission of the laser spot through the slit opening and around the wraparound path; or, alternatively, through direct uninterrupted reflection back to the filter without a slit opening); and a cyan light component generated when the second instance of the blue segment is in line with the incident light (this could be emission toward the filter with no substantial blue light direct reflection such as occurs for the green, red and yellow segments; or, alternatively, emission both toward the filter and via the wraparound path where a thicker coating is put over a transparent part of the wheel).

Another approach, would be to have same instances for the two segments, but to reconfigure the window into multiple subwindow sections angularly separated by solid radially directed dividers or spoke partitions. The spoke partitions could then be coated with a thicker layer of phosphor (viz., more uniform with no gaps) and the subwindow sections would have no phosphor. In such case, as the blue segment arc rotates past the incident laser spot, the spot would alternately encounter the phosphor coated spokes and the subwindow sections, giving a color sequence of multiple repetitions of first direct blue laser light (through wraparound path or reflection), then cyan emission.

With these approaches, the blue segment(s) of the color wheel alternately generate blue light directly from the laser light and blue light (from cyan light components) indirectly through phosphor emission. The respective blue/cyan light illumination times are defined by the times the input laser beam spot is incident on the direct blue light transmitting plate/reflecting surface sections and the cyan light emitting phosphor sections of the rotating wheel. And, the blue/cyan combination color contribution to the pixels of the displayed image is determined by settings of the modulator elements (viz., "on"/"off" mirror settings) of the spatial light modulator (viz., digital micromirror device) integrated over those times. The physical separation of direct blue color sections from cyan emitting sections of the wheel may, however, limit some of the flexibility for setting the weighted time segments for grayscale intensity determinations.

Another approach illustrated by the wheel 708 configuration shown in FIGS. 7 and 8 provides both direct blue laser light and phosphor emitted cyan color light during all times that the input light beam spot is incident on the blue segments 712. Having both direct blue light and emitted cyan light for the entire duration of traversal of the blue segment arcs in front of the incident laser beam offers an ability to vary the size of the time intervals used for grayscale determination of intensities. For example, with a uniform blue/cyan color generated throughout the entire blue segment light generation time, a PWM approach that sets mirror positions for time segments weighted on a binary scale (e.g., $\Delta t_1=2\times\Delta t_0$; $\Delta t_2=2\times\Delta t_1$; etc.) is not tied to the geometric structure of the wheel segment 712 and may readily be changed to another PWM approach that uses different (binary or non-binary) time segment sizes and weightings.

Figure 9:
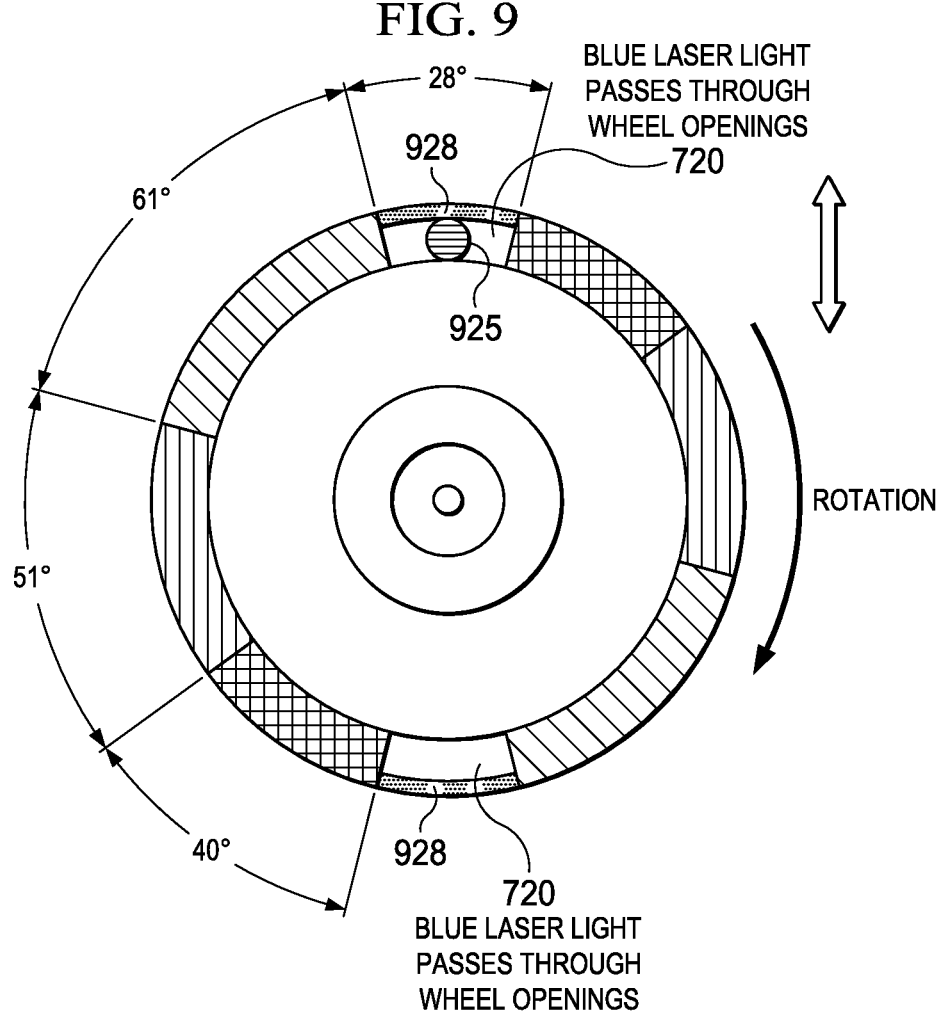
FIG. 9 illustrates input beam spot placement for the color wheel of FIGS. 7 and 8.

In one version of the illustrated approach (see FIGS. 7 and 8), a cyan phosphor coating 928 is uniformly deposited over a front reflective surface of an arcuate metal strip 722 for each instance of the blue segment 712. The wheel 708 is then positioned relative to the incoming laser beam, so that part of the beam spot 925 is incident on (and passes through) the window 720 and part of the beam is incident on (and excites) the cyan phosphor coating 928 over the arcuate metal strip 722, as shown in FIG. 9. With this arrangement, the phosphor coating 928 may be applied to a uniform thickness and the window area 720 may be left unobstructed. Adjusting the position of the wheel 708 radially relative to the incidence position of the laser spot (as indicated by the arrow 930 in FIG. 9) will alter the relative contributions of the blue laser light and the phosphor emitted cyan light to change the generated illumination so that a more preferred blue color point may be obtained.

For the illustrated arrangement, the arcuate extent of the window 720 may be left as before (e.g., 28°); however, the radial extent of the window may be reduced to provide a wider outer arcuate strip 722 for the cyan phosphor coating 928. Setting the sum of the radial extents of both the window 720 and the coated outer strip 722 to slightly greater than the size of the incident laser beam spot 925 will enable some radial adjustment to vary the generated blue color point. Setting the radial extent of the other (green, red, yellow) segment 714, 716, 718 phosphor coatings at least equal to that sum will ensure that the beam spot 925 remains on the other segment phosphor during rotation after the radial adjustment.

The choice of placement of the cyan producing phosphor 928 and the size of the window 720 may be varied to suit individual needs and preferences. Instead of, or in addition to, coating the outer strip 722 with the cyan phosphor, the cyan phosphor coating may be applied to an arcuate region of the wheel bordering the inside of the window 720. In such case, the inner edge of the window 720 may need to be placed further outward radially such as radially outwardly of the inner arc of the phosphor coatings over the other color segments. The outer strip 722 may be formed by leaving a portion of the wheel remaining, or by adding a strip after cutting out an annular sector of the wheel. And, although a strip bordering the outside edge of the window may be preferred for rotational stability and noise reduction, the blue segment may also be formed, for example, without any outer boundary to the window and with a cyan coating just on the window inside arcuate edge.

Providing separate arcwise continuous regions for the simultaneous generation of segment color contributions from both the laser light and phosphor emission, enables the phosphor coating to be thicker and avoids the complexities associated with obtaining simultaneous generation from or applying PWM grayscaling to illumination from same (e.g., lightly coated glass plate or reflective metal surface) or arcwise non-continuous (different instances, or spoke partitioned window) blue segment regions.

If desired, a transparent plate may be added to the window, or the window may be defined by an uncoated portion of a transparent part of the wheel itself. For example, the wheel may be formed completely or partially of transparent material (e.g., a transparent full or partial ring outside border) and the window may be defined by an area left uncovered by the phosphor coating applied to the blue area. (Transparent regions in other color segments may be coated by forming the phosphor over a previously deposited metal or other reflective material.)

Although additional complexity may be introduced thereby, it is contemplated that instead of a single window bordered by an inside arc and (optionally) and outside arc, the blue segment may be formed with multiple arcuate slits formed at radially spaced locations, and separated by narrow arcuate strips, one or more of which can be coated with the cyan emitting phosphor. Also, instead of providing a window for transmission of a portion of the incident laser beam spot, the window area (or any one or more of multiple window areas) may be replaced by an area of uncovered reflective material. That is, the area of the sector of the annulus which serves as the blue color contributor may be made up of one or more arc-wise continuous regions coated with cyan emitting phosphor and one or more arc-wise continuous uncoated reflective regions that reflect, rather than transmit, the blue laser light for the blue laser light wavelength contribution to the combined cyan phosphor/blue laser light generation over the full travel of the blue segment.

Also, in the case of a color wheel having concentric annular tracks or rings of the respective different color emitting phosphors located at different radially spaced locations (see, e.g., the color wheel described in Patent Application Pub. No. US 2011/0211333 A1), the blue segment may be configured as a ring having one or more radially spaced window or phosphor uncoated subring regions bordered by a corresponding number of arcuate bordering (strip) regions coated with cyan producing phosphor. In an example of such concentric track arrangement, the times of color generation for each region and sequence of colors may be determined by relative radial displacement of an input beam incident spot from one color generating band to the next. Here, the beam may be placed for the dwell time of the blue color generation so that the spot is incident simultaneously both on the one or more blue laser transmitting and/or reflecting subrings and on the one or more cyan light generating phosphor coated subrings, and the color point may established be established by adjustable radial placement of the spot relative to the rings.

Those skilled in the art to which the invention relates will appreciate that yet other modifications may be made to the described embodiments, and also that many other embodiments are possible, all within the scope of the claimed invention.

What is claimed is:

1. An apparatus for generating blue color illumination for use in a projection system, comprising: a blue laser light source; a color wheel having segments of respective different color light emitting phosphors formed over blue laser light non-transmitting portions and at least one blue color generating segment, the blue color generating segment having a blue laser light non-transmitting first portion, a blue laser light transmitting second portion disposed inwardly in a radial direction from the first portion, and cyan color light emitting phosphor over the first portion; a dichroic filter for reflecting the blue laser light from the light source onto the respective segments as the color wheel is rotated and for selectively transmitting the different color light and cyan color light emitted back from the color wheel along a projection optical path, the light source, color wheel and filter being relatively dimensioned and configured for reflecting the blue laser light from the light source simultaneously onto the first and second portions of the blue light generating segment for an entire duration of traversal of the blue color generating segment in front of the light source; and a wraparound optical path for directing blue laser light transmitted through the light transmitting second portion back to the dichroic filter for reflection along the projection optical path.

2. The apparatus of claim 1, wherein the second portion is free of cyan color light emitting phosphor.

3. The apparatus of claim 1, wherein the second portion comprises an opening in the wheel.

* * * * *